(12) United States Patent
Payne et al.

(10) Patent No.: US 8,341,017 B2
(45) Date of Patent: Dec. 25, 2012

(54) SYSTEM AND METHOD FOR OPTIMIZING SEARCH RESULT LISTINGS

(75) Inventors: Christopher D. Payne, Seattle, WA (US); Eric B. Watson, Redmond, WA (US); Sally K. Salas, Issaquah, WA (US); Sreeram Krishnan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2001 days.

(21) Appl. No.: 10/805,873

(22) Filed: Mar. 22, 2004

(65) Prior Publication Data

US 2005/0154718 A1    Jul. 14, 2005

Related U.S. Application Data

(60) Provisional application No. 60/535,353, filed on Jan. 9, 2004.

(51) Int. Cl.
*G06Q 30/00* (2012.01)
(52) U.S. Cl. .................................................. 705/14.43
(58) Field of Classification Search ................ 705/14
See application file for complete search history.

(56) References Cited

U.S. PATENT DOCUMENTS

| | | | |
|---|---|---|---|
| 6,223,215 B1 | 4/2001 | Hunt et al. |
| 6,269,361 B1 | 7/2001 | Davis et al. |
| 6,326,962 B1 | 12/2001 | Szabo |
| 6,360,227 B1 | 3/2002 | Aggarwal et al. |
| 6,434,550 B1 | 8/2002 | Warner et al. |
| 6,526,440 B1 | 2/2003 | Bharat |
| 6,529,903 B2 | 3/2003 | Smith et al. |
| 6,615,209 B1 | 9/2003 | Gomes et al. |
| 6,643,639 B2 | 11/2003 | Biebesheimer et al. |
| 6,647,383 B1 | 11/2003 | August et al. |
| 6,658,423 B1 | 12/2003 | Pugh et al. |
| 6,678,681 B1 | 1/2004 | Brin |
| 7,031,932 B1 | 4/2006 | Lipsky et al. |
| 7,444,327 B2 | 10/2008 | Watson et al. |
| 2002/0123988 A1 | 9/2002 | Dean et al. |

(Continued)

FOREIGN PATENT DOCUMENTS

EP    1 282 051 A1    2/2003
(Continued)

OTHER PUBLICATIONS

Tedeschi, B., "Measuring Online Ad Effectiveness," nytimes.com, Nov. 3, 2003, <http://www.nytimes.com/2003/11/03/technology/03E3com.HTML?PAGEWANTED=PRINT&POSITION=> [Retrieved Nov. 3, 2003].

(Continued)

*Primary Examiner* — John G. Weiss
*Assistant Examiner* — Darnell Pouncil
(74) *Attorney, Agent, or Firm* — Shook, Hardy & Bacon L.L.P.

(57) ABSTRACT

A method, system, and computer-accessible medium are provided for optimizing search result listings in a search engine user interface. The system and method provide an automated way of promoting and demoting the placement of a search result listing between more or less desirable locations, based on the listing's performance in a given placement. Promoting and demoting placements is based on a threshold performance for the listing against which the actual performance of a listing is measured. The threshold performance may be advantageously varied to accommodate different revenue and relevance goals for a particular search engine or portion of the search engine's market.

41 Claims, 11 Drawing Sheets

U.S. PATENT DOCUMENTS

| | | | |
|---|---|---|---|
| 2002/0133481 | A1 | 9/2002 | Smith et al. |
| 2002/0152204 | A1 | 10/2002 | Ortega et al. |
| 2003/0014331 | A1 | 1/2003 | Simons |
| 2003/0033292 | A1* | 2/2003 | Meisel et al. ............... 707/3 |
| 2003/0046161 | A1* | 3/2003 | Kamangar et al. ........... 705/14 |
| 2003/0135490 | A1 | 7/2003 | Barrett et al. |
| 2003/0149938 | A1* | 8/2003 | McElfresh et al. ........... 715/517 |
| 2003/0172075 | A1 | 9/2003 | Reisman |
| 2003/0220837 | A1 | 11/2003 | Asayama |
| 2004/0167845 | A1 | 8/2004 | Corn et al. |
| 2005/0028188 | A1 | 2/2005 | Latona et al. |
| 2005/0080771 | A1 | 4/2005 | Fish |
| 2005/0096980 | A1 | 5/2005 | Koningstein |
| 2005/0097204 | A1 | 5/2005 | Horowitz et al. |
| 2005/0154716 | A1 | 7/2005 | Watson |
| 2005/0154717 | A1 | 7/2005 | Watson |

FOREIGN PATENT DOCUMENTS

| | | |
|---|---|---|
| EP | 1282051 | 5/2003 |
| JP | 2002175316 A | 6/2002 |
| JP | 2003501729 A | 1/2003 |
| JP | 2003233684 A | 8/2003 |
| WO | WO99/41694 | 8/1999 |
| WO | WO 99/41694 A1 | 8/1999 |
| WO | WO01/82178 A2 | 11/2001 |
| WO | WO 01/82178 A2 | 11/2001 |
| WO | WO01/82178 A3 | 11/2001 |
| WO | WO 02/27529 A | 4/2002 |
| WO | WO02/27529 A2 | 4/2002 |
| WO | WO02/27529 A3 | 4/2002 |
| WO | WO 02/063514 A | 8/2002 |
| WO | WO02/063514 A2 | 8/2002 |
| WO | WO02/063514 A3 | 8/2002 |

OTHER PUBLICATIONS

Walker, L., "Finding More Than You Bargained for," washingtonpost.com, Dec. 19, 2002, <http://nl.newsbank.com/nl-search/we/Archives?p_action=doc&p_docid=0F806C198A52 . . . > [Retrieved Nov. 21, 2003].

Walker, L., "Search Engine Listings Up for Bid," SiliconValley.com, Mar. 6, 2002, <http://www.siliconvalley.com/mld/siliconvalley/business/technology/personal_technolog . . . > [Retrieved Nov. 21, 2003].

Walker, L., "We Get What They Pay for," washingtonpost.com, Feb. 28, 2002, <http://nl.newsbank.com/nl-search/we/Archives?p_action=doc&p_docid=0F1F861F927C . . . > [Retrieved Nov. 21, 2003].

Walker, L., "Web Giants Seek Fortune in Search Ads," washingtonpost.com, Jul. 17, 2003, <http://nl.newsbank.com/nl-search/we/Archives?p_action=doc&p_docid=0FC5A6F721EA . . . > [Retrieved Nov. 21, 2003].

B. Tedeschi, "Measuring Online Ad Effectiveness," nytimesi.com, Nov. 3, 2003,<http://www.nytimes.com/2003/11/03/technology/03E3com.HTML?PAGEWANTED=PRINT & POSITION=> [Retrieved Nov. 3, 2003].

L. Walker, "Finding More Than You Bargained for," washingtonpost.com, Dec. 19, 2002,<http://nl.newsbank.com/nl-search/we/Archives?p_action=doc&p_docid=0F806C198A52 . . . >[Retrieved Nov. 21, 2003].

L. Walker, "Search Engine Listings Up for Bid," SiliconValley.com, Mar. 6, 2002, <http://www.siliconvalley.com/mid/siliconvalley/business/technology/personal_technolog . . . >[Retrieved Nov. 21, 2003].

L. Walker, "We Get What We Pay for," washingtonpost.com, Feb. 28, 2002,<http://nl.newsbank.com/nl-search/we/Archives?p_action=doc&p_docid=0F1F861F927C . . . >[Retrieved Nov. 21, 2003].

L. Walker, "Web Giants Seek Fortune in Search Ads," washingtonpost.com, Jul. 17, 2003,<http://nl.newsbank.com/nl-search/we/Archives?p_action=doc&p_docid=OFC5A6F721EA . . . >[Retrieved Nov. 21, 2003].

Office Action mailed Nov. 27, 2009 in U.S. Appl. No. 10/805,870, 29 pages.

Notice of Allowance mailed Aug. 20, 2008 U.S. Appl. No. 10/805,731.

Office Action mailed Feb. 12, 2008 U.S. Appl. No. 10/805,731.

Office Action mailed May 21, 2007 U.S. Appl. No. 10/805,731.

Office Action mailed Oct. 30, 2006 U.S. Appl. No. 10/805,731.

First Office Action dispatched Jan. 4, 2008 in Chinese Pat. Appl. 200510056188.2.

Office Action issued by EPO dated Apr. 24, 2006 for EP Pat. Appl. 05102101.2.

Second Office Action dispatched May 22, 2009 on Chinese Pat. Appl. 200510056188.2.

Office Action mailed Apr. 21, 2008 for U.S. Appl. No. 10/805,870.

Office Action mailed Nov. 17, 2008 for U.S. Appl. No. 10/805,870.

Office Action mailed Jun. 9, 2009 for U.S. Appl. No. 10/805,870.

EPO Search Report, mailed Sep. 15, 2005 for EP Application No. 05102101.2, 3 pages.

Noriko Shingaki, "Eye Gaze Analysis on the Use of a Search Engine in Humane Information Retrieval", Institute of Image Information and Television Engineers Technical Report, vol. 25, No. 18, pp. 17-24, Japan, Feb. 23, 2001. In Notice of Rejection of Japanese Pat. App. No. 2005-082472 on Jun. 4, 2010. Partial translation included.

Office Action mailed Jun. 9, 2010 in U.S. Appl. No. 10/805,870, filed Mar. 22, 2004, 24 pages.

Noriko Shingaki, "Eye Gaze Analysis on the Use of a Search Engine in Humane Information Retrieval", Institute of Image Information and Television Engineers Technical Report, vol. 25, No. 18, pp. 17-24, Japan, Feb. 23, 2001 (Partial translation included).

Final Office Action U.S. Appl. No. 10/805,870, Mail date: Feb. 16, 2011.

* cited by examiner

SYSTEM AND METHOD FOR OPTIMIZING SEARCH RESULT LISTINGS

CROSS-REFERENCE TO RELATED APPLICATION

This application claims the benefit of Provisional Application No. 60/535,353, filed Jan. 9, 2004, which is hereby claimed under 35 U.S.C. §119.

FIELD OF THE INVENTION

In general, the present invention relates to computer software and search engines and, in particular, to systems and methods for optimizing search result listings.

BACKGROUND OF THE INVENTION

The Internet search engine has become an important source of revenue for the service providers who operate them. The revenue is primarily generated from the display of advertisements to search engine users. The more Internet traffic that a search engine receives, the more attractive it is to advertisers, and the more revenue it can generate. It is generally regarded that the best way search engines can increase traffic is to provide highly relevant search results. But what is relevant today may not be relevant tomorrow, or even relevant later the same day. It is difficult for service providers to keep pace with the rapid changes in searchable content based on seasonal and popular trends and topical events in the news.

Complicating matters is the increasingly popular use of paid advertisements directly in the list of results that the search engine generates. The advertiser bids on popular search terms in exchange for which the search engine prominently lists their advertisement along with the other unpaid search results returned for the bidded search term. For example, when a user types in the search term "digital camera," the search results list might include a paid listing for Nikon® brand digital cameras preceding a relevant but unpaid listing for an independent digital photography Web site that reviews several brands of digital cameras.

The practice of including paid listings along with the search results is commonly referred to as pay-per-click advertising, since the advertiser pays only when the user actually clicks on the listing (as opposed to more conventional Internet advertising, referred to as pay-per-impression, where the advertiser pays whenever the listing is displayed). Pay-per-click advertising is somewhat at odds with providing highly relevant search results, as the user might not consider the paid listings to be particularly relevant to their search. Cluttering up the search results with pay-per-click (PPC) listings in which users show little interest may impair the user experience to such an extent that traffic to the search engine site declines as users choose to conduct their Web searches elsewhere. Moreover, low-performing PPC listings, i.e., those with a low click-through rate, generate little revenue, regardless of how much the advertiser might have bid for the search term. Thus, the small revenue gained from low-performing listings may not be worth the risk of alienating users by displaying them along with the more relevant but unpaid search results.

Since the amount of display area in a search results page is limited, some search engine operators place potentially less relevant search results as well as PPC listings for some or all bidded search terms off to one side-referred to as the sidebar-instead of placing them directly in line with the relevant unpaid listings. For instance, during the Thanksgiving season, the search term "turkey" might produce seasonal "in-line" listings for Thanksgiving turkey preparation (either unpaid or PPC listings) that would normally be placed in the sidebar with the twin goals of (a) increasing revenue for the search engine, and (b) increasing relevance of the results for the user. Search engine operators might also place potentially lower revenue paid listings for bidded search terms in the sidebar as well. Using the digital camera example, the search results list might include a PPC listing for competing Sony® brand digital cameras placed in the sidebar next to the in-line listings for Nikon and the independent digital photography Web site, because the amount of Sony's bid for the search term "digital camera" was less than Nikon's.

In addition to maximizing the use of the available display area, sidebar placements have the advantage of being less distracting to the search engine user. However, experience has shown that the click-through rate for sidebar placements is inherently lower than the click-through rate for in-line placements, regardless of a particular listing's click-through performance. Not surprisingly, users are simply less likely to notice and click listings appearing in a less desirable sidebar location than those appearing in the more desirable in-line location, i.e., directly in the list of search results. Consequently, one of the problems with placing listings in the sidebar is that such placements will likely generate less revenue and attract less repeat traffic than their in-line counterparts, even when the listings are otherwise high performers. Furthermore, as noted already, what is relevant today may not be relevant tomorrow, or even relevant later the same day. The determination of where to best place search result listings can change rapidly, making it difficult to place listings in the optimal location at any given time.

SUMMARY OF THE INVENTION

To overcome the above-described problems, a system, method, and computer-accessible medium for optimizing search result listings are provided. The system and method provide an automated way of promoting and demoting the placement of a search result listing between more or less desirable locations based on the listing's performance in a given placement.

In accordance with one aspect of the present invention, the determination of when to promote or demote the placement of a listing to or from a given location is based on a threshold performance for the listing against which the actual performance of a listing is measured. The threshold performance for a listing may be fixed, or more preferably may be advantageously varied to accommodate different revenue and relevance goals for a particular search engine or portion of the search engine's market.

In accordance with another aspect of the present invention, the system and method provide for an improved measurement of the performance of a listing by taking the listing's context into consideration. The listing's context may include a number of factors that are known to influence performance, including the location of the listing, the amount of display area that the listing occupies, the neighboring listings, and the display format characteristics of the listing, e.g., the color, highlighting, animation, etc. When a listing's performance falls below the performance threshold, the listing may be demoted to a less prominent location or omitted from the search result listings altogether. Conversely, when a listing's performance exceeds the performance threshold, the listing may be retained in or promoted to a more prominent location.

In accordance with a further aspect of the present invention, the search result listings may be promoted and demoted individually or as part of a set of results returned for a particular search term. When listings are promoted and demoted as part of a set of results, the system and method further provide for an improved measurement of the performance of a listing by taking the listing's position within the set of results into consideration. In addition, in accordance with a still further aspect of the present invention, the automatic promotion and demotion may be applied to any ranked search result, including both paid and unpaid listings.

In accordance with yet other aspects of the present invention, a computer-accessible medium for optimizing search result listings is provided. The computer-accessible medium comprises data structures and computer-executable components comprising a listing promoter/demoter for automatically promoting and demoting search result listings based on actual performance measurements and performance thresholds. The data structures define search result listing and performance data in a manner that is generally consistent with the above-described method. Likewise, the computer-executable components are capable of performing actions generally consistent with the above-described method.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The following discussion is intended to provide a brief, general description of a computing system suitable for implementing various features of an embodiment of the invention. While the computing system will be described in the general context of a personal and server computer or other types of computing devices usable in a distributed computing environment where complementary tasks are performed by remote computing devices linked together through a communication network, those skilled in the art will appreciate that the invention may be practiced with many other computer system configurations, including multiprocessor systems, minicomputers, mainframe computers, and the like. In addition to the more conventional computer systems described above, those skilled in the art will recognize that the invention may be practiced on other computing devices including laptop computers, tablet computers, personal digital assistants (PDAs), cellular telephones, and other devices upon which computer software or other digital content is installed.

While aspects of the invention may be described in terms of programs or processes executed by a Web browser in conjunction with a personal computer or programs or processes executed by a search engine in conjunction with a server computer, those skilled in the art will recognize that those aspects also may be implemented in combination with other program modules. Generally, program modules include routines, subroutines, programs, processes, components, data structures, functions, interfaces, objects, etc., which perform particular tasks or implement particular abstract data types.

Figure 1:
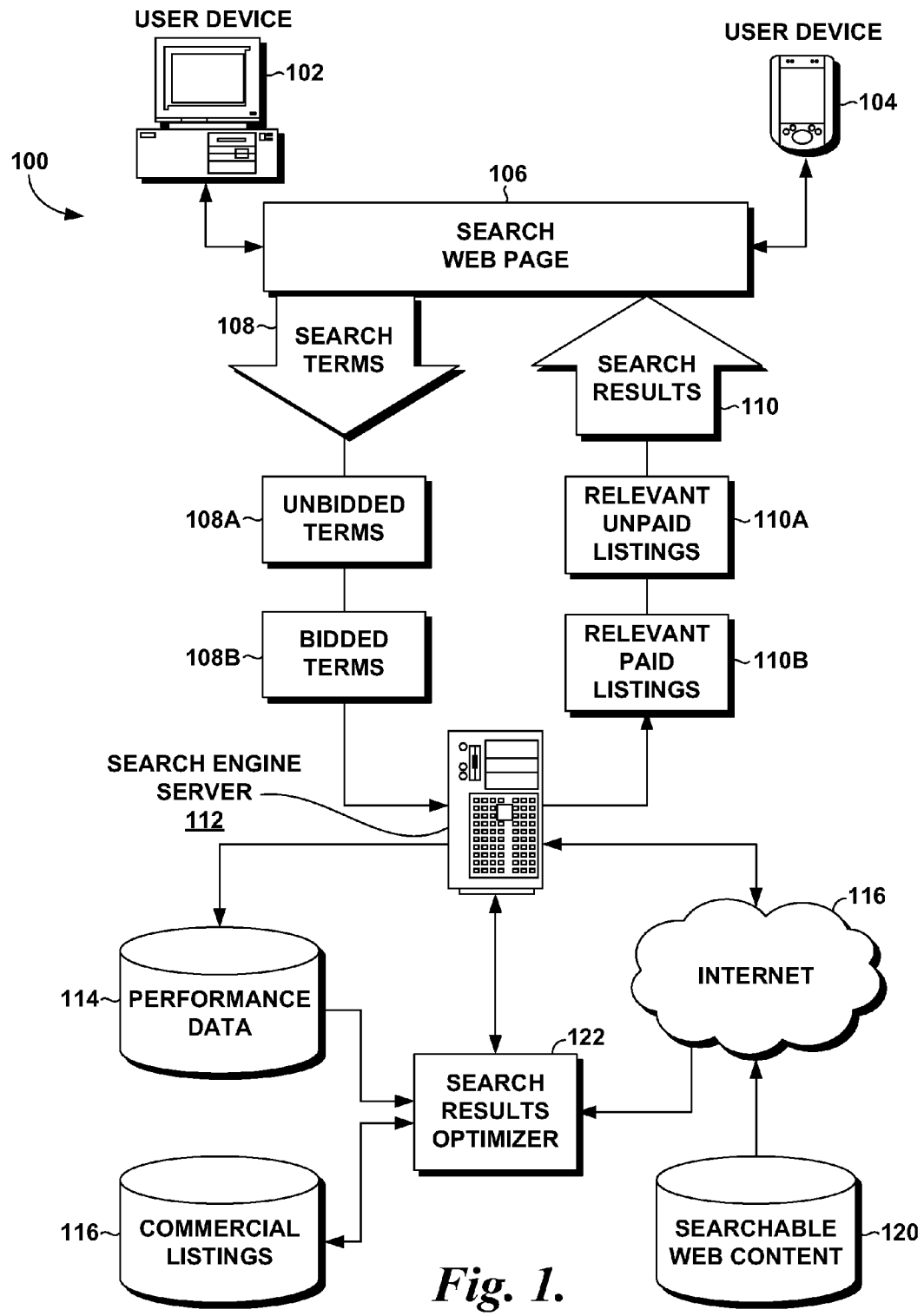
FIG. 1 is a depiction of an exemplary search result optimization system and one suitable operating environment in which search result listings may be optimized in accordance with the present invention.

FIG. 1 is a depiction of an exemplary search result optimization system 100 and one suitable operating environment in which search result listings may be optimized in accordance with an embodiment of the present invention. As shown, the operating environment includes a search engine server 112 that is generally responsible for providing front-end user communication with various user devices, such as devices 102 and 104, and back-end searching services. The front-end communication provided by the search engine server 112 may include, among other services, generating text and/or graphics organized as a search Web page 106 using hypertext transfer protocols in response to information and search queries received from the various user devices, such as a computer system 102 and a personal digital assistant (PDA) 104. The back-end searching services provided by the search engine server 112 may include, among other services, using the information and search queries received from the various user devices 102, 104 to search for relevant Web content, obtain commercial content, and track Web page and search result listing performance.

In the environment shown in FIG. 1, the search engine server 112 generates a search Web page 106 into which a user may input search terms 108 to initiate a search for Web content 120 via the Internet 118. The search terms 108 are transmitted to a search engine server 112 that uses the terms to perform a search for Web content 120 that is relevant to the search terms 108. The search engine server 112 relays the relevant Web content as a set of search results 110 for display to the user in the search Web page 106.

In the environment shown in FIG. 1, the user devices 102, 104 communicate with a search engine server 112 via one or more computer networks, such as the Internet 118. Protocols and components for communicating via the Internet are well known to those of ordinary skill in the art of computer network communications. Communication between user devices 102, 104 and the search engine server 112 may also be enabled by local wired or wireless computer network connections. The search engine server 112 depicted in FIG. 1 may also operate in a distributed computing environment, which can comprise several computer systems that are interconnected via communication links, e.g., using one or more computer networks or direct connections. However, it will be appreciated by those of ordinary skill in the art that the server 112 could equally operate in a computer system having fewer or greater number of components than are illustrated in FIG. 1. Thus, the depiction of the operating environment in FIG. 1 should be taken as exemplary and not limiting to the scope of the claims that follow.

In one suitable implementation, the search optimization system 100 enables a search engine operator to advantageously optimize the placement of search results to maximize advertising revenue for the operator as well as relevance for the user. The search result optimization system 100 includes a search result optimizer process 122 that operates in conjunction with stored performance data 114 to optimize the search results 110 that are displayed in the search Web page 106. The stored performance data 114 includes the number of impressions of a particular search results listing, i.e., the number of times the listing is displayed to the user on a search Web page 106 in response to the entry of a search term 108, as well as the number of clicks on the listing, i.e., the number of times a user clicks on the listing after it is displayed. The search engine server 112 is further configured to detect and filter out fraudulent clicks as is known in the art, such as spam clicking, simulated clicks by robots, and other suspect clicks such as multiple clicks from the same IP address within a certain amount of time or from unidentified sources. The performance of a particular listing is measured by the listing's click-through rate (CTR), which is determined by comparing the number of times the listing is displayed to the number of times the user clicks on the listing after it is displayed, i.e., dividing the number of impressions by the number of clicks. The stored performance data 114 may also include other data tracked by the search engine server 112, such as the location of the listing when it was displayed on the search Web page 106 and other characteristics of the listing that may influence performance, such as the color, size, font, animation, graphics, and adjacent listing performance data.

The search terms 108 may include ordinary, unbidded terms 108A on which advertisers have not bid, as well as bidded terms 108B on which advertisers have bid a dollar amount to have their commercial listing 116 displayed whenever the term is entered. In response to the search term entry, a search engine server 112 serves a user with search results 110 that the user can view via the search Web page 106. The search results 110 may comprise both ordinary unpaid listings 110A that are obtained from the searchable Web content 120, as well as paid listings 110B that may be obtained from a commercial listings database 116. The paid listings 110B are primarily the type of pay-per-click (PPC) listings already described above, but could also include other types of commercial listings, such as paid directory listings and other sponsored listings assembled by the search engine operator. In operation, the search engine server 112 determines whether the search term 108 entered by the user is an ordinary, unbidded term 108A, or a bidded term 108B. The search engine operator performs a search using the search term and, in addition, uses the bidded search term 108B to further obtain any corresponding commercial listings 116 that can be included in the search results 110.

The unpaid listing 110A, when clicked, links the user to Web content 120 relevant to the entered search term 108. When the paid listing 110B is clicked, it links the user to Web content 120 provided by the advertiser corresponding to the paid listing 110B. As the user clicks on the listings 110A and 110B that comprise the search results 110 displayed on the search Web page 106, the search engine server 112 captures the performance data 114 for each listing, including data that may aid in interpreting the performance of the listing, such as the context of the listing, i.e., the location of the listing on the Web page 106, the amount of display area that the listing occupies, the neighboring listings, and the display characteristics of the listing, e.g., the color, highlighting, animation, etc. From the performance data 114, the search optimization system 100 is able to derive and interpret certain statistical information about the listing, particularly the above-described CTR.

Figure 2:
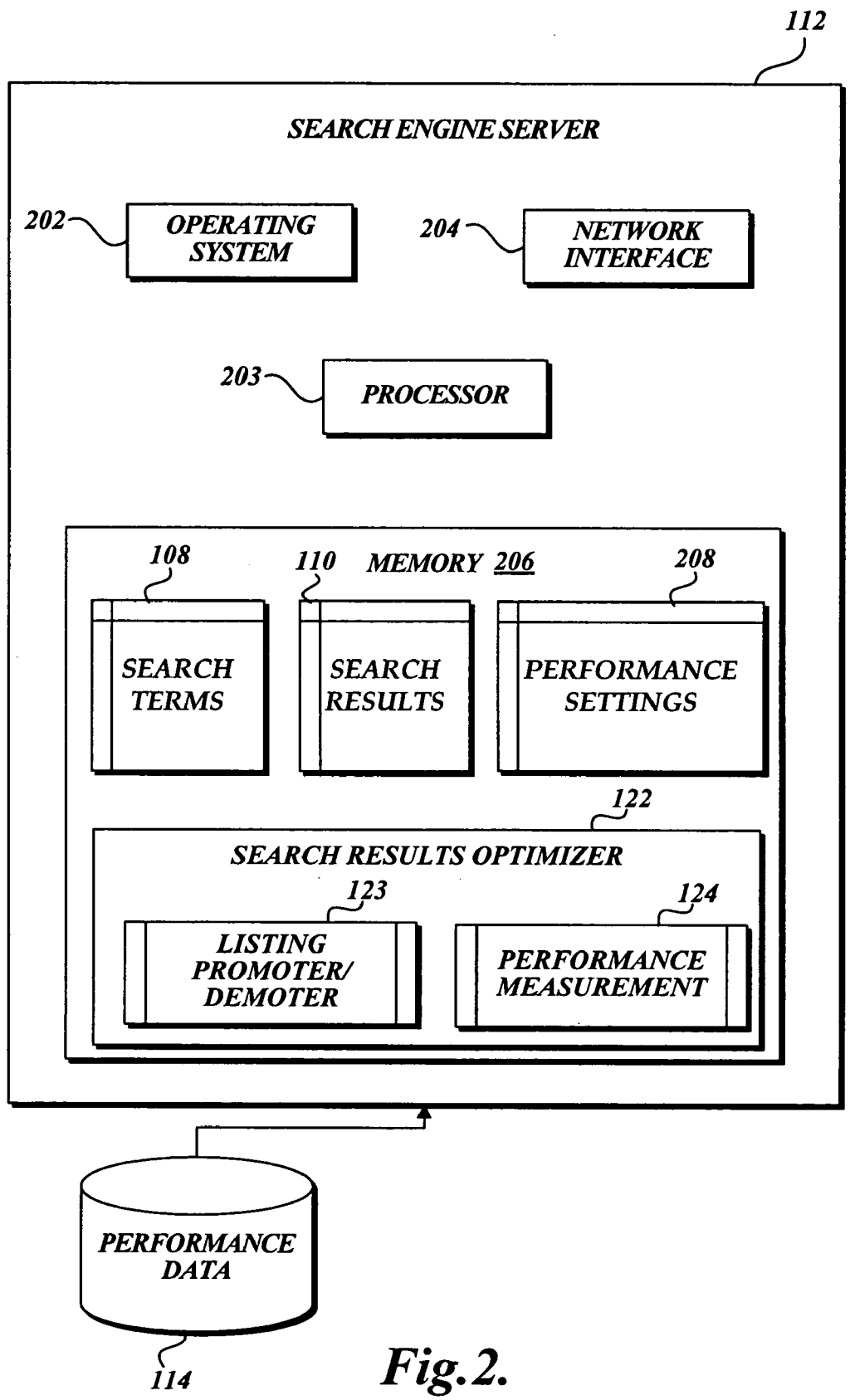
FIG. 2 is a block diagram depicting in further detail an arrangement of certain computing components of the search engine server of FIG. 1 for implementing an embodiment of the present invention.

FIG. 2 is a block diagram depicting in further detail an arrangement of certain exemplary computing components of the search engine server 112 that are responsible for the operation of the search result optimization system 100 shown in FIG. 1. Specifically, the search engine server 112 is shown including an operating system 202, processor 203, and memory 206 to implement executable program instructions for the general administration and operation of the search engine server 112. The search engine server 112 further includes a network interface 204 to communicate with a network, such as the Internet 118, to respond to user search terms 108 and to provide search results 110. Suitable implementations for the operating system 202, processor 203, memory 206, and network interface 204 are known or commercially available, and are readily implemented by persons having ordinary skill in the art—articularly in light of the disclosure herein.

The memory 206 of the search engine server 112 includes computer executable program instructions comprising the search result optimizer process 122. In some embodiments, the memory 206 may further include various stored data, such as the above-described search terms 108 and search results 110, as well as performance settings 208. The search result optimizer process 122 uses the performance settings 208 against which to measure the performance of a search result listing and to place the listing in an optimal location on the search Web page 106, as will be described in further detail below.

The search result optimizer process 122 includes a listing promoter/demoter process 123 and a performance measurement process 124. The listing promoter/demoter process 123 operates in conjunction with the performance measurement process 124 to promote and demote one or more listings in the search results 110 from a more prominent location on the search Web page 106 to a less prominent location, and vice versa, based on a measurement of the listing's performance in a given location. The more prominent location on the search Web page 106 is generally the location that is in line with the placement of the main search result listings, and the less prominent location is generally the location that is off to one side of the search result listings, such as the sidebar. Listings with better performance are generally maintained in or promoted to the more prominent location on the search Web page 106, whereas listings with poorer performance are generally maintained in or demoted to the less prominent location.

The performance measurement process 124 measures the performance of a listing using the listing's CTR, as well as the listing's context as obtained from the stored performance data 114 that was previously captured by the search engine server 112, as described above. The measurement of the performance is based on stored performance settings 208. The stored performance settings 208 are tunable settings that include certain threshold performance levels against which the performance measurement process 124 measures the performance of a listing in a given location. For example, the threshold performance level for a listing in a more prominent location on the search Web page 106 may be a 5% CTR, while the level for a listing in a less prominent location may be only a 3% CTR. Listings in the more prominent location, but with CTRs that fall below 5%, may be demoted to a less prominent location on the search Web page 106, whereas listings in the less prominent location, but with CTRs that meet or exceed 3%, may be promoted to the more prominent location. The settings 208 reflect, at least in part, the search engine operator's expectations for listing performance in a given location, and may be tuned to accommodate different expectations of performance in one search engine market to the next to further the search engine operator's goals for advertising revenue and search results relevance.

Since the location of a listing on the search Web page 106 significantly influences the CTR of the listing, it is important that the decision to promote or demote a listing is based on accurate measurements of performance. Accordingly, in a preferred embodiment, the performance measurement process 124 takes into account the listing's context as it appeared in the search Web page 106 when measuring the performance of the listing, including the current location, size, color, and any other characteristic of the listing that is known to affect the CTR. For example, placing a listing in a more prominent location alone may raise the CTR by at least one percentage point. Thus a listing that has a CTR of 4% in a more prominent location is performing about the same as if it had a CTR of 3% in the less prominent location. Such a performance might not justify keeping the listing in the more prominent location, but could justify keeping the listing in the less prominent location.

To further improve the accuracy of the measurement of performance, in one embodiment, the search result optimizer 122 may employ statistical algorithms in the listing promoter/demoter 123 and performance measurement 124 processes to ensure that only statistically significant measurements of actual performance and comparisons to expected performance from one point in time to the next form the basis for making a decision to promote or demote a given listing or set of listings.

Figure 3:
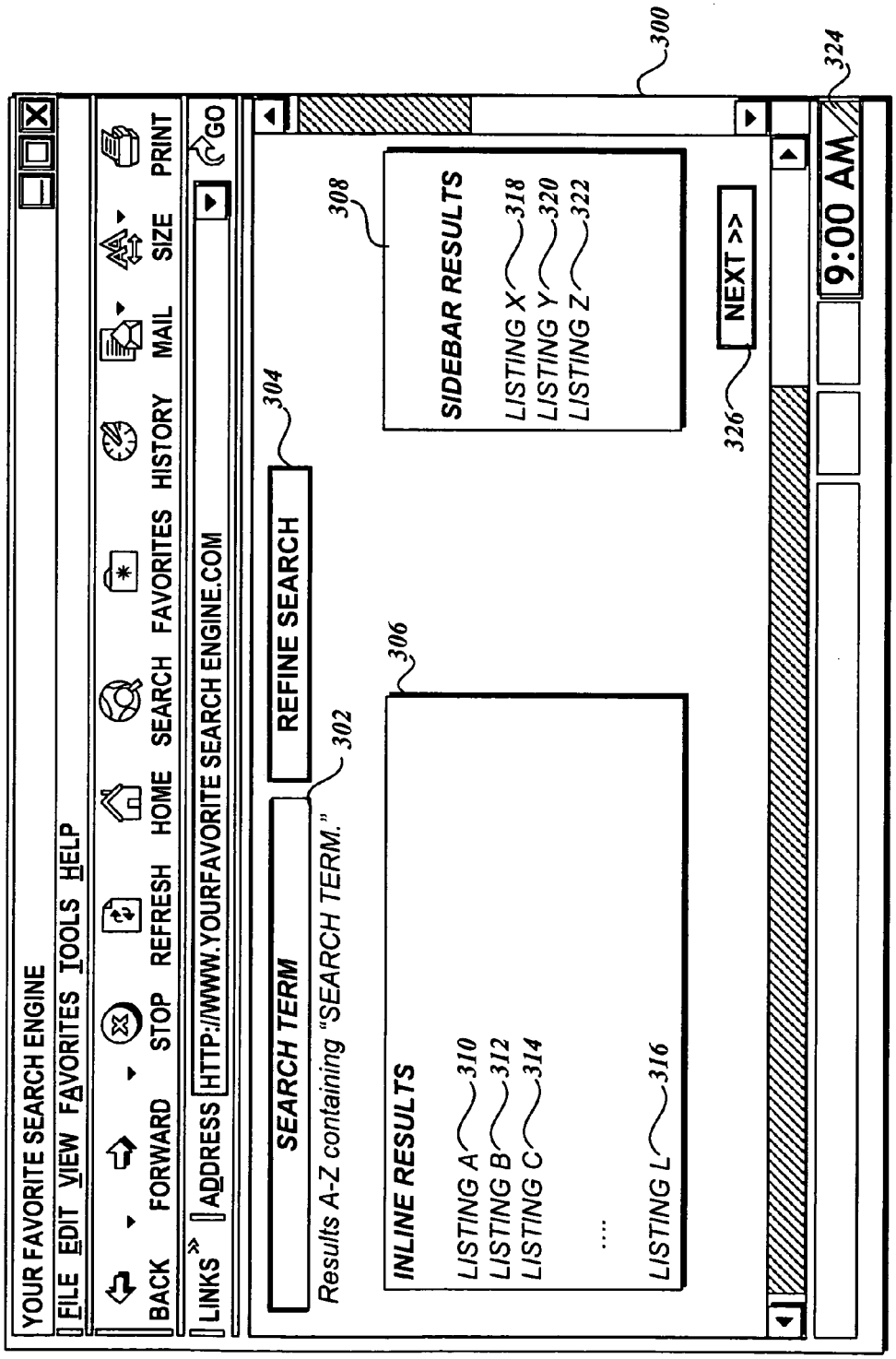
FIG. 3 is a pictorial diagram of an exemplary search engine user interface for implementing an embodiment of the present invention.

FIG. 3 illustrates a browser program 300 displaying a Web page 106 in which is depicted an exemplary search engine user interface for implementing an embodiment of the present invention. The Web page 106 may be generated by the search engine server 112 and delivered to the user's computing device 102, 104 via the Internet 118. The search engine user interface displays the previously entered search terms 108 in the text box 302 and prompts the user to refine the search with additional search terms, if desired, using the command button labeled "REFINE SEARCH" 304. The search engine user interface displays the search results 110 in one of two or more locations on the Web page 106 in FIG. 3, including a more prominent in-line result location 306 and a less prominent sidebar result location 308. In the illustrated example, the Web page 106, here shown at time 9:00 a.m., as depicted in time box 324, includes an in-line result location 306 that is typically used to display the relevant search results obtained for the search term, displaying Listing A 310, Listing B 312, Listing C 314, as well as any paid listings that qualify for inclusion in the in-line location 306 based on their performance. In one embodiment, the paid listings may qualify for inclusion in the in-line location 306 only when their CTR is at or above the minimum threshold performance setting for the in-line location 306. The less prominent location, here the sidebar results location 308 is typically used to display less relevant listings or paid listings with as yet unproven performance—here displaying Listing X 318, Listing Y 320, and Listing Z 322. As with the in-line location, listings may qualify for inclusion in the sidebar location 308 only when their CTR is at or above the minimum threshold performance setting for the sidebar location 308. The search engine user interface may include other hypertext links, such as a "Next" link 326, providing a link to additional Web pages not illustrated. The Next link 326 may produce, for example, additional search results containing the search term listed in box 302.

Figure 4:
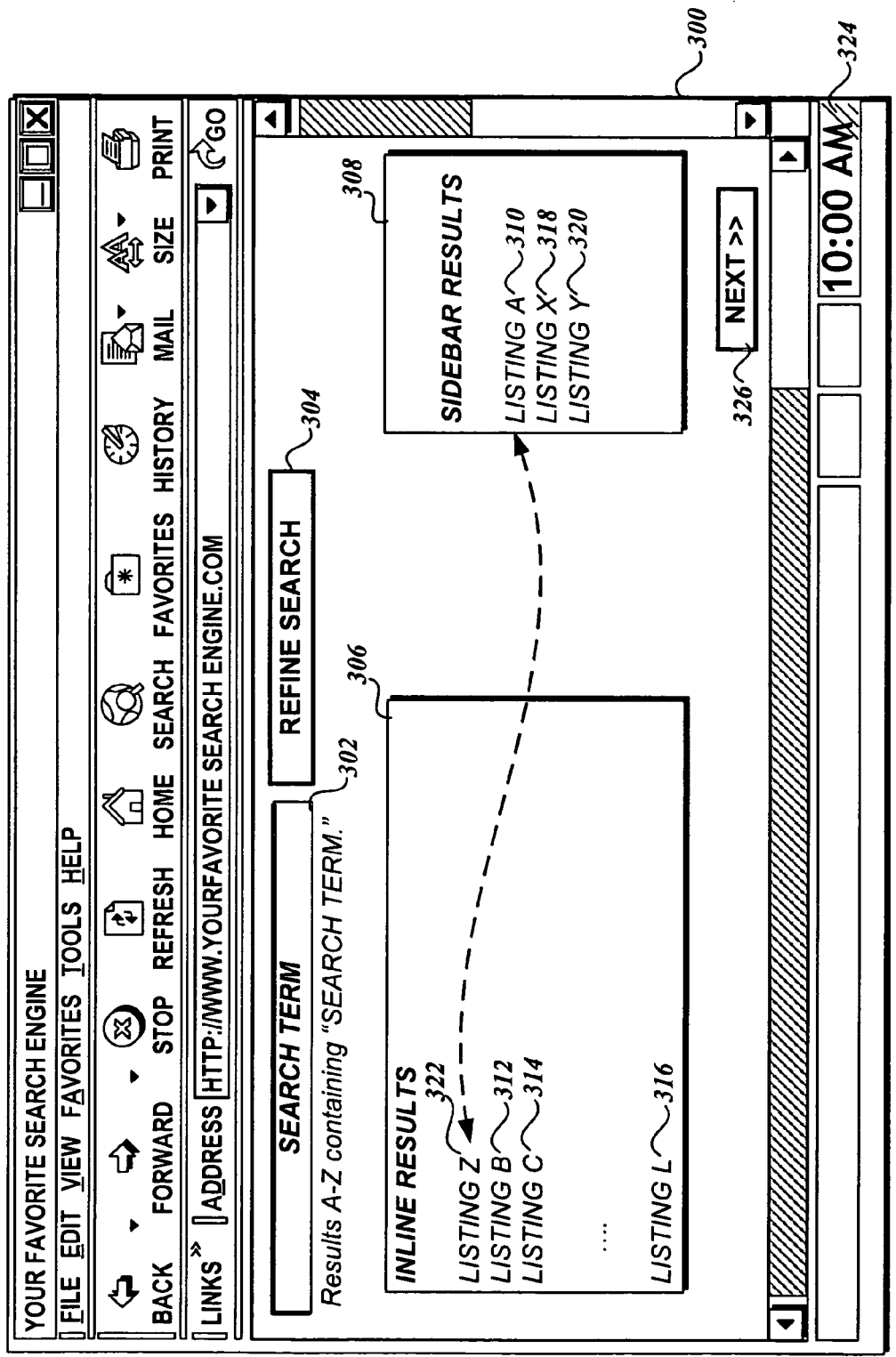
FIG. 4 is a pictorial diagram of the exemplary search engine user interface of FIG. 3 at a later time, after the search result listings have been optimized in accordance with an embodiment of the present invention.

FIG. 4 is a pictorial diagram of the exemplary search engine user interface of FIG. 3, but at a later time—here 10:00 a.m., as shown in time box 324—after the search results Listings A-Z provided in response to the search term entered in box 302 have been optimized in accordance with an embodiment of the present invention. In the illustrated example, Listing Z 322 apparently outperformed its former location in the sidebar results 308, whereas Listing A 310 apparently underperformed its former location in the in-line results 306. Consequently, the in-line results location 306 has been altered to demote Listing A 310 from its in-line location in FIG. 3, and to promote Listing Z 322 from its sidebar location in FIG. 3 to its new location in FIG. 4 in the in-line results 306. Conversely, the sidebar results location 308 has been altered to promote Listing Z 322, and to add the demoted Listing A 310 that was formerly located in the in-line results location 306.

Figure 5:
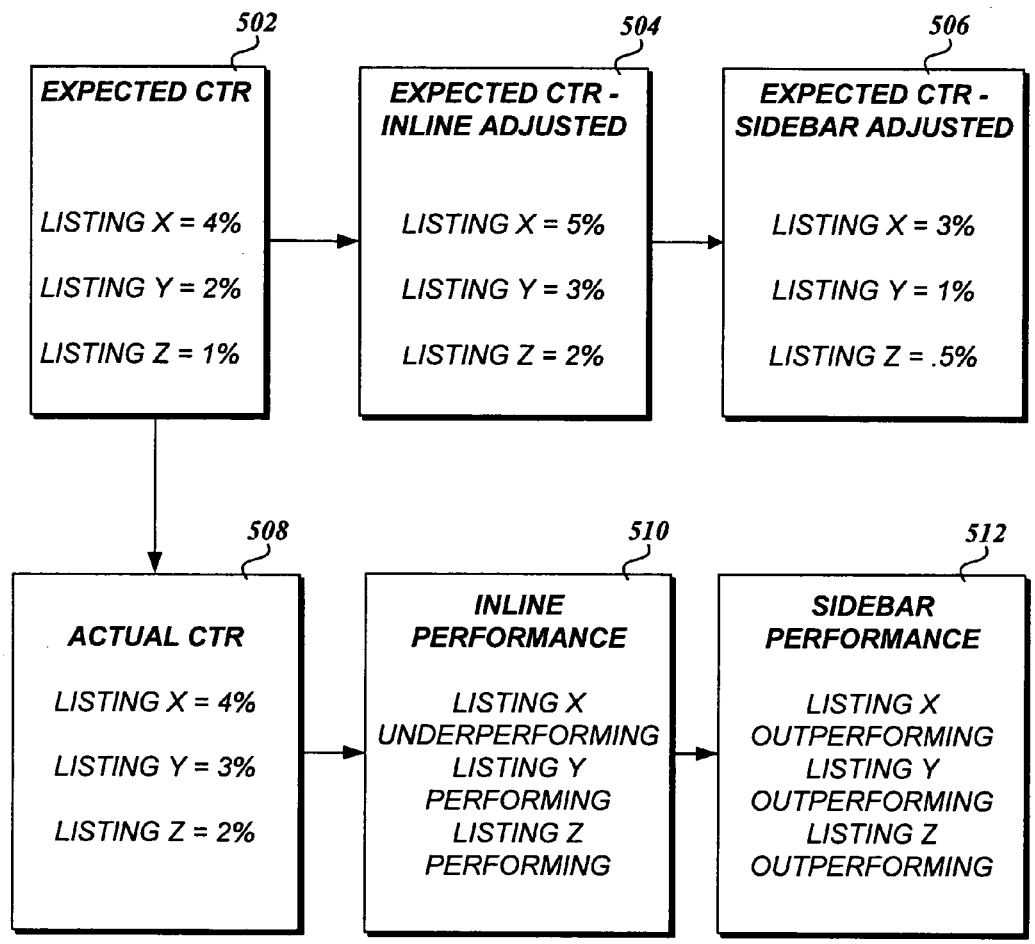
FIG. 5 is a block diagram of exemplary search result listings, their corresponding performance settings, and how the listings may be optimized in accordance with an embodiment of the present invention.

FIG. 5 is a block diagram depicting exemplary search result listings, their corresponding performance settings, and how the placement of the listings may be optimized in accordance with an embodiment of the present invention. In the example, an expected CTR 502 for Listings X, Y, and Z may be set to respective percentages 4%, 2%, and 1%, i.e., 4 click-throughs for every 100 impressions, 2 click-throughs etc. When the listings are located in a more prominent in-line location, such as the in-line results 306 previously illustrated in FIGS. 3-4, the expected CTR, as adjusted for the in-line location, may be respectively, 5%, 3%, and 2%. When the listings are located in a less prominent location such as the sidebar results 308 previously illustrated in FIGS. 3-4, the expected CTR, as adjusted for the sidebar location, may be respectively 3%, 1%, and 0.5%.

In operation, the search engine server 112 tracks the actual performance of the Listings X, Y, and Z at 508, resulting in actual performances that may be respectively 4%, 3%, and 2%. When the Listings X, Y, and Z are located in the more prominent in-line location, the performance measurement process 124 of the search result optimizer process 122 measures the actual performances 508 against the in-line adjusted expected CTR 504. When the Listings X, Y, and Z are located in the less prominent in-line location, the performance measurement process 124 of the search result optimizer process 122 measures the actual performances 508 against the sidebar adjusted expected CTR 506. Consequently, when the Listings X, Y, and Z are located in the more prominent in-line location, the performance measurement process 124 determines that the in-line performances 510 of the listings are such that Listing X, at 4%, is underperforming the in-line expected CTR 504, while Listings Y and Z, at 3% and 2%, respectively, are performing just at the in-line expected CTR 504. On the other hand, when the Listings X, Y, and Z are located in the less prominent sidebar location, the performance measurement process 124 determines that the sidebar performances 512 of the listings are such that Listing X at 4% is outperforming the sidebar expected CTR 506, as are Listings Y and Z. Based on those determinations of the performance measurement process 124, the listing promoter/demoter process 123 would demote Listing X and retain Listings Y and Z based on their in-line performance 510, but would promote Listings X, Y, and Z based on their sidebar performance 512.

In some cases, the search result optimization system 100 may optimize the placement of listings on a set-by-set basis instead of, or in addition to, a listing-by-listing basis. However, depending on the performance of the listings that comprise a given set, this might lead to less than optimal placements of listings. To address this possibility, the search result optimizer process 122 may be further configured to tier the search result listings to take certain characteristics of a set into account when measuring performance, such as the number and position of listings in the set, or the size of the listings themselves.

Figure 6:
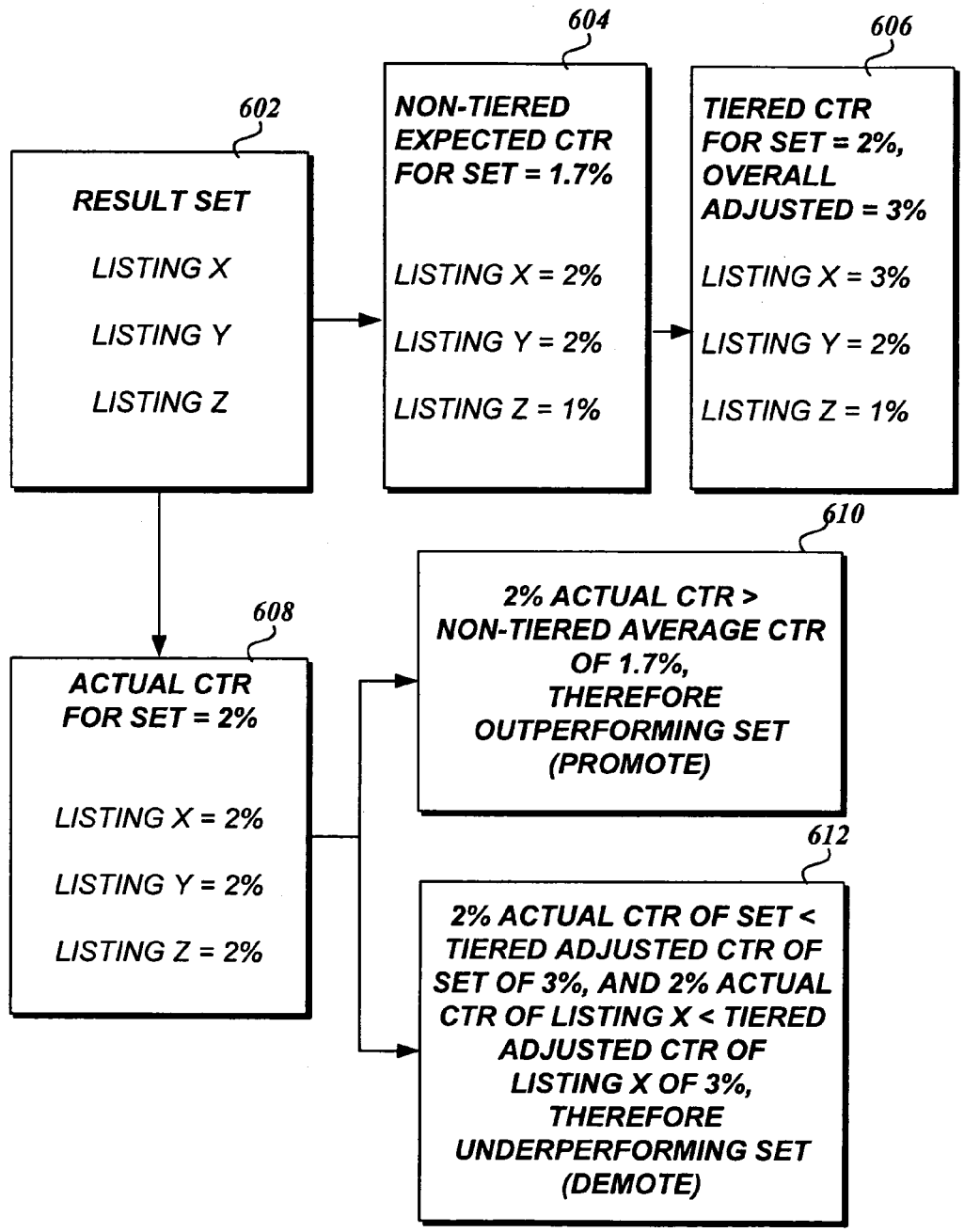
FIG. 6 is a block diagram of further exemplary search result listings, their corresponding performance settings, and how the listings may be optimized in accordance with an embodiment of the present invention.

FIG. 6 is a block diagram of further exemplary search result listings, their corresponding performance settings, and how the listings may be optimized in accordance with an embodiment of the present invention. In the illustrated example, Listings X, Y, and Z comprise a tiered result set 602. A tiered result set 602 is a set of search result listings for which there is an overall expected CTR for the set that depends on the number and/or size of results in a set. This is because the greater the number of listings that are returned in a given search results set, or the larger the listings are themselves in the search results set, the larger the amount of space the search results 110 (in FIG. 1) will occupy on the Web page 106 (in FIG. 1). For this reason, the expected CTR for larger result sets is generally higher than the expected CTR for smaller result sets. Moreover, the expected CTR for any individual listing may vary based on its position within the set. Thus, the first listing in a set may have a higher expected CTR than the listings appearing further down in the set of results. Without tiering, the actual CTR for a set would be based on an average CTR of the individual listings of the set. Averaging the CTR could result in a set having listings with mediocre performance that average up to the minimum overall CTR for the set, leading to an undesirable promotion to or retention of the set in a particular location.

Using tiering, the performance measurement process 124 may compare the overall performance of a set of listings to an expected CTR for the set that has been adjusted to take into account the number and size of the listings in the set. For instance, in the illustrated example at block 604, the expected CTR for the individual Listings X, Y, and Z of a result set is 2%, 2%, and 1%, respectively, resulting in an average CTR for the set of 1.7%. As illustrated in block 606, since Listing X is in the top position, the expected CTR for Listing X using tiering is upwardly adjusted to 3% from 2%. Thus, the new average CTR for the tiered set is (3+2+1)/3=2%. In addition, the new average CTR for the tiered set is also upwardly adjusted to an overall CTR of 3% from 2% to reflect the number and size of the Listings X, Y, and Z in the set.

In operation, the search engine server 112 captures performance data 114 that reveals that the actual performance 608 of the individual Listings X, Y, and Z returned in result set 602 is 2% each, resulting in an average CTR for the set of 2%. As illustrated in block 610, were the performance measurement process 124 to measure the performance of the set 602 without using tiering, the set would be considered to have exceeded the nontiered average expected CTR of 1.7% at 604. Moreover, the set would have even met the tiered average expected CTR of 2% at 606. Either way, the set would have qualified for retention in or promotion to a more prominent location on the Web page 106, even though the individual performance of the top Listing X was a mediocre 2%, well below the upwardly adjusted expected CTR for Listing X of 3% at 606 based on its position at the top of the set.

But, as illustrated in block 612, using tiering, the performance measurement process 124 instead measures the performance of the set 602 against the tiered adjusted CTRs for the set and the listings. Thus, in the illustrated example, the performance measurement process 124 determines that the actual performance 608 of the set of 2% is less than the tiered adjusted CTR of 3% for the set. In addition, the performance measurement process 124 determines that the actual performance of Listing X of 2% is less than the tiered adjusted CTR of 3% for the listing. Accordingly, neither the set nor the listing qualifies for retention in or promotion to a more prominent location on the Web page 106, and would instead be demoted or removed from the Web page 106 altogether.

Figure 7:
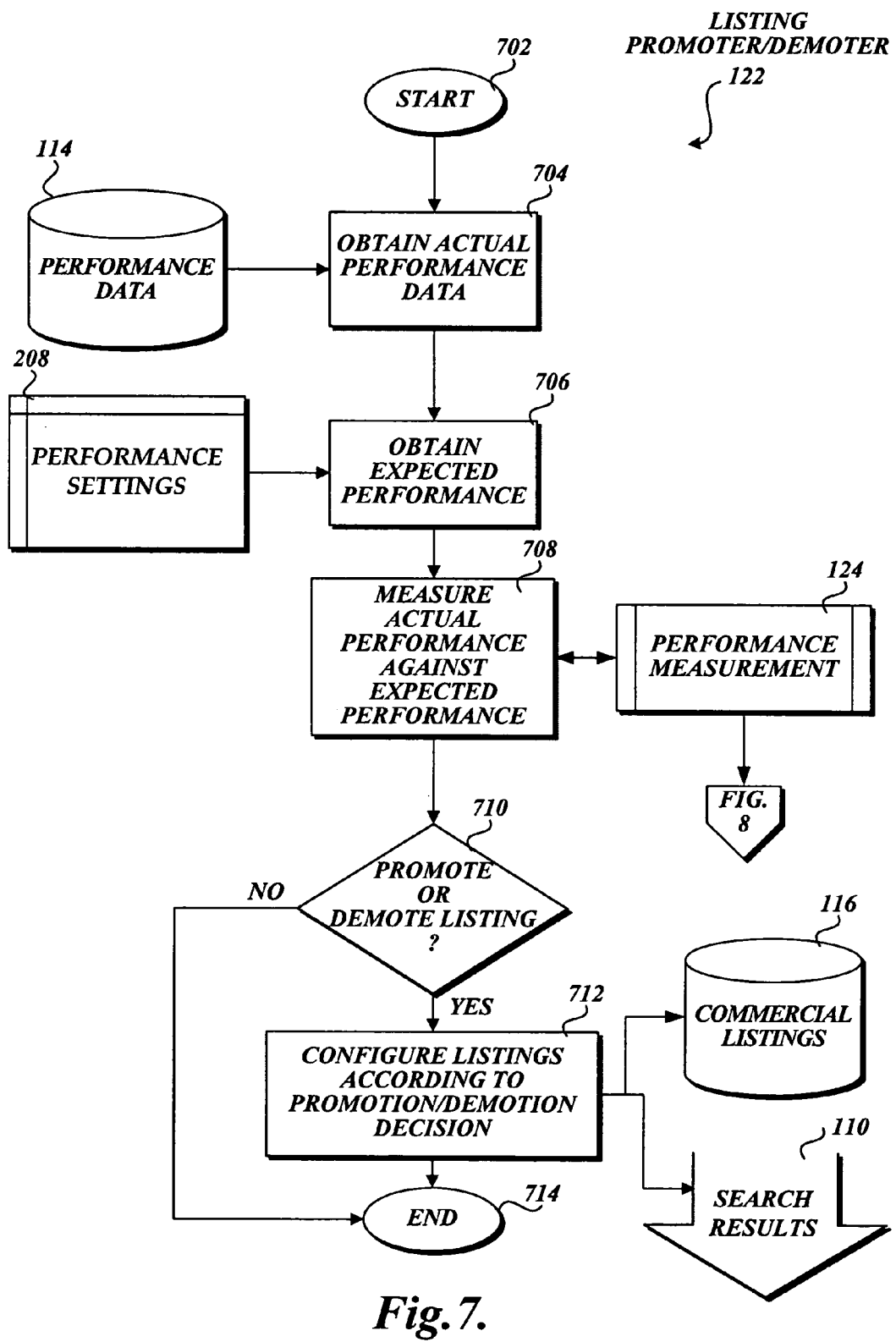
FIG. 7 is a flow diagram illustrating the logic performed in conjunction with the search engine server of FIGS. 1 and 2 for promoting and demoting placements of search result listings in accordance with an embodiment of the present invention.

FIG. 7 is a flow diagram illustrating the logic performed in conjunction with the search engine server of FIGS. 1 and 2 for promoting and demoting placements of search result listings in accordance with an embodiment of the present invention. The optimizer process 122 begins at the start block 702 and continues at processing block 704 to obtain the actual performance data of the listings from the stored performance data 114. As described above, the actual performance data may include not only the impression and click data, but may also include other data known to influence the performance of a listing, such as the location, the position of a listing within a set, the size of the listing, i.e., how much space the listing occupies on the Web page 106, and any display format characteristics that enhance or otherwise alter the appearance of the listing, such as the color, animation, graphics, highlighting, etc.

At processing block 706, the optimizer process 122 obtains the performance settings 208 against which the performance of a listing or a set of listings is measured. The performance settings 208, as already described above, are tunable settings that may vary from one implementation of the search result optimization system 100 to the next, and may even be changed during the operation of the search result optimization system 100 to meet the revenue and relevance goals of the search engine operator. The performance settings 208 may include expected performance levels for listings and/or sets of listings. In one embodiment, the performance settings 208 may include expected performance levels based on location, size, or other data known to influence the performance of a listing.

At processing block 708, the optimizer process 122 measures the actual performance of a listing or set of listings against the expected performance by performing the performance measurement process 124, the processing logic of which is explained in further detail with reference to FIG. 8 below. Once the measurement has been completed, the optimizer process 122 continues at decision block 710 to determine whether the listing (or set of listings) should be promoted or demoted. The decision will depend on the performance measurement as determined in performance measurement process 124 and the current placement or location of the listing or set of listings under consideration. For example, when the listing or set of listings is in a less prominent location but has exceeded the performance levels for that location, then the optimizer process 122 may promote the listing. On the other hand, when the listing or set of listings is in a more prominent location but has failed to meet the performance levels for that location, then the optimizer process 122 may demote the listing. These are just two examples of decisions that the listing promoter/demoter may implement; other variations on the decision-making process may be implemented at decision block 710, such as the decision to retain a listing or set of listings in its current location, without departing from the scope of the claims that follow.

Once the decision to promote or demote a listing or set of listings has been made, the optimizer process 122 continues at processing block 712 to implement the decision by configuring the listings according to the promotion/demotion decision. For example, in one embodiment, the optimizer process 122 may configure the commercial listings database 116 to configure a paid listing that has been demoted to appear in a less prominent location on the Web page 106 when it is next included in a set of search results 110 by search engine 112, and vice versa. In another embodiment, the optimizer process 122 may configure the search results 110 in real time to place a listing that has been demoted in a less prominent location when it is displayed on the Web page 106, and vice versa. After the configuration process 712 is completed, the optimizer process 122 logic ends at termination block 714.

Figure 8:
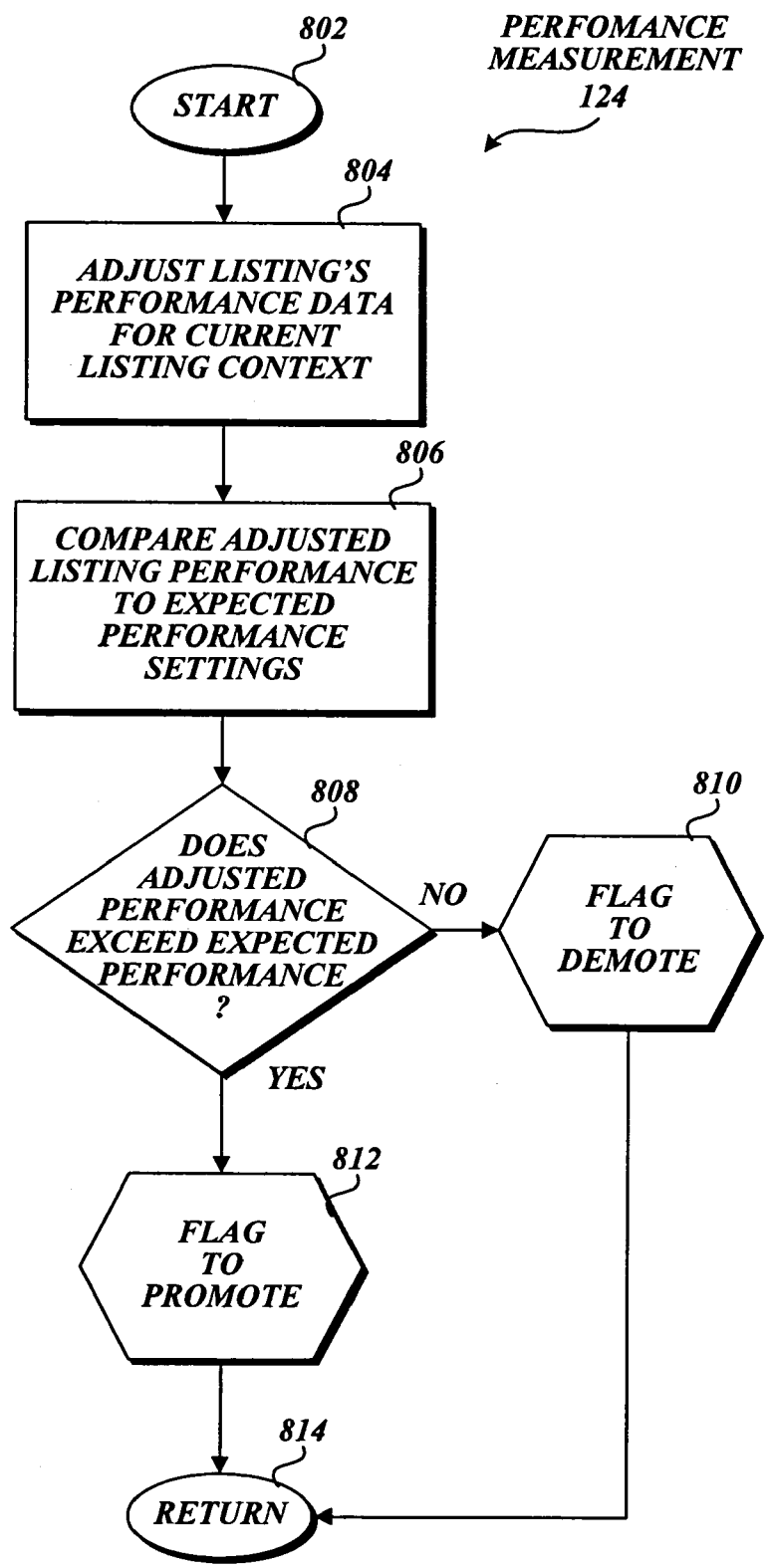
FIG. 8 is a flow diagram illustrating additional logic performed in conjunction with the search engine server of FIGS. 1 and 2 for measuring the performance of search result listings in accordance with an embodiment of the present invention.

FIG. 8 is a flow diagram illustrating additional logic performed in conjunction with the search engine server 112 of FIGS. 1 and 2 for measuring the performance of search result listings in accordance with an embodiment of the present invention. In one embodiment, the performance measurement process 124 begins at the start block 802, and continues at processing block 804 to normalize the actual performance data for the listing or set of listings under consideration to reflect the current context of the listing or set of listings, e.g. the location, position of listing within a set, etc. Normalization of the actual performance data includes adjusting the data upwards to compensate for contextual factors that are known to negatively affect the CTR and, conversely, adjusting the data downward to compensate for contextual factors that are known to positively affect the CTR. The contextual factors that are considered include location, position, appearance, etc., and any other factor known to influence the CTR. At processing block 806, the performance measurement process 124 continues at processing block 806 to compare the adjusted performance of the listing or set of listings to the expected performance settings as previously obtained from the stored performance settings 208.

In another embodiment, the adjustments performed in process block 804 may not be necessary when the adjustments in the expectations for performance have been reflected in the stored performance settings themselves. In other words, the listing's context may be taken into account by incorporating the reduced or enhanced expectations into the performance settings against which the actual performance of a listing is measured or, alternatively, the listing's context may be taken into account programmatically during the performance measurement process. This is the case, for example, when the performance settings are configured to include one expectation for performance when a listing is placed in a more prominent location, and another (reduced) expectation for performance when the listing is placed in a less prominent location. Moreover, combinations of the foregoing alternatives may be employed without departing from the scope of the claims that follow.

The performance measurement process 124 continues at decision block 808 to determine whether the actual performance exceeds the expected performance after taking the context of the listing into account. If so, the performance measurement process 124 flags the listing or set of listings under consideration for promotion at preparatory block 810. If not, the performance measurement process 124 flags the listing or set of listings under consideration for demotion at preparatory block 810. The performance measurement process 124 returns at termination block 814 to the optimizer process 122, described above with reference to FIG. 7.

Figure 9:
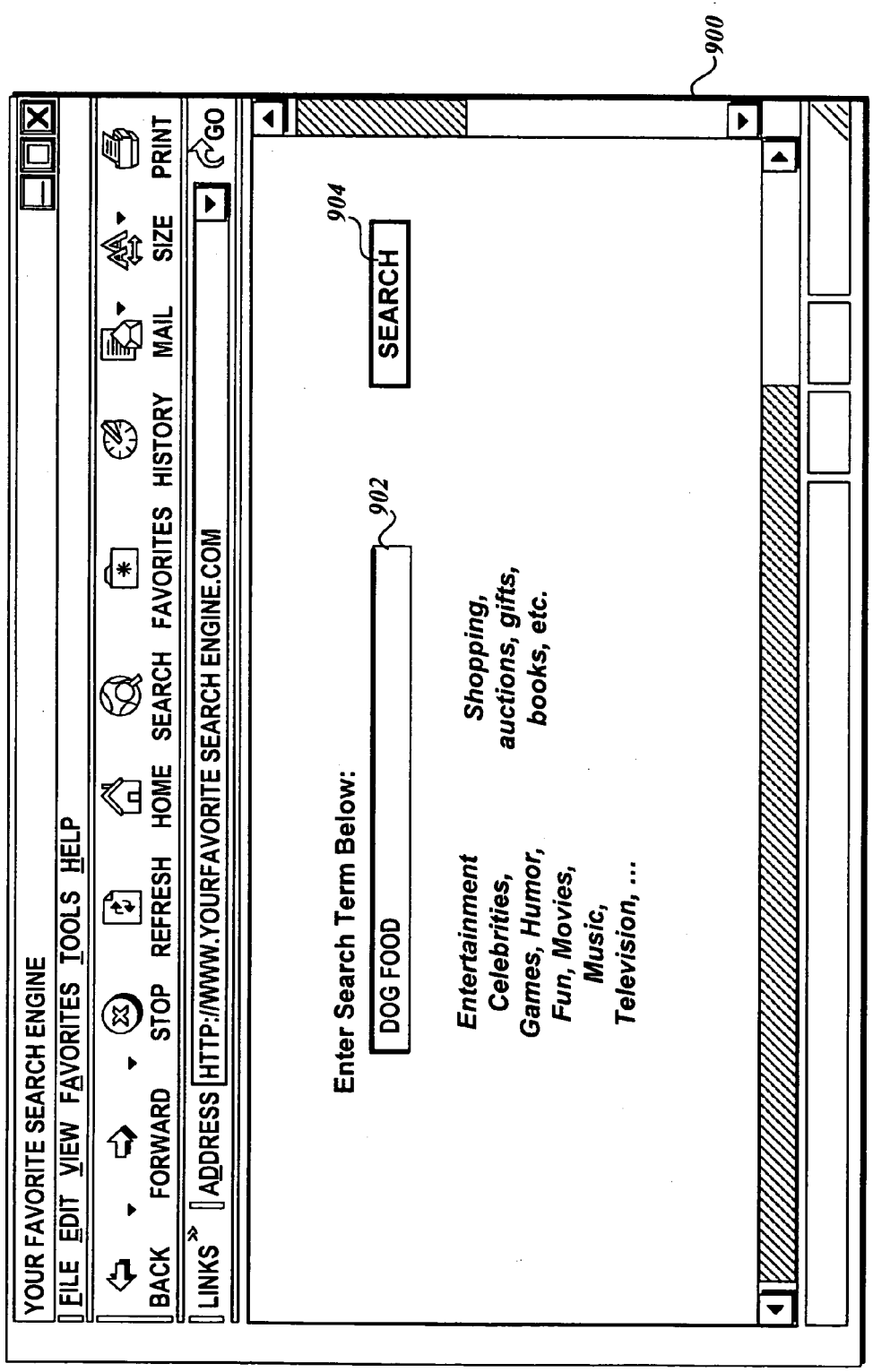
FIG. 9 is a pictorial diagram illustrating an example implementation of entering a search term in an exemplary search engine user interface.

FIG. 9 illustrates a browser program 900 displaying a search Web page in which the user is able to enter one or more search terms in a search entry box 902. The Web page may be generated by the search engine server 112 and delivered to the user's computing device 102, 104 via the Internet. The user enters the desired search terms in the box 902 and uses a pointing device, keyboard, or other input device to initiate the search, e.g., by clicking on the button "SEARCH" identified at reference numeral 904. In the illustrated example in FIG. 9, the user has entered the search term "DOG FOOD." The results of the user's search are displayed to the user, as illustrated in FIG. 10.

Figure 10:
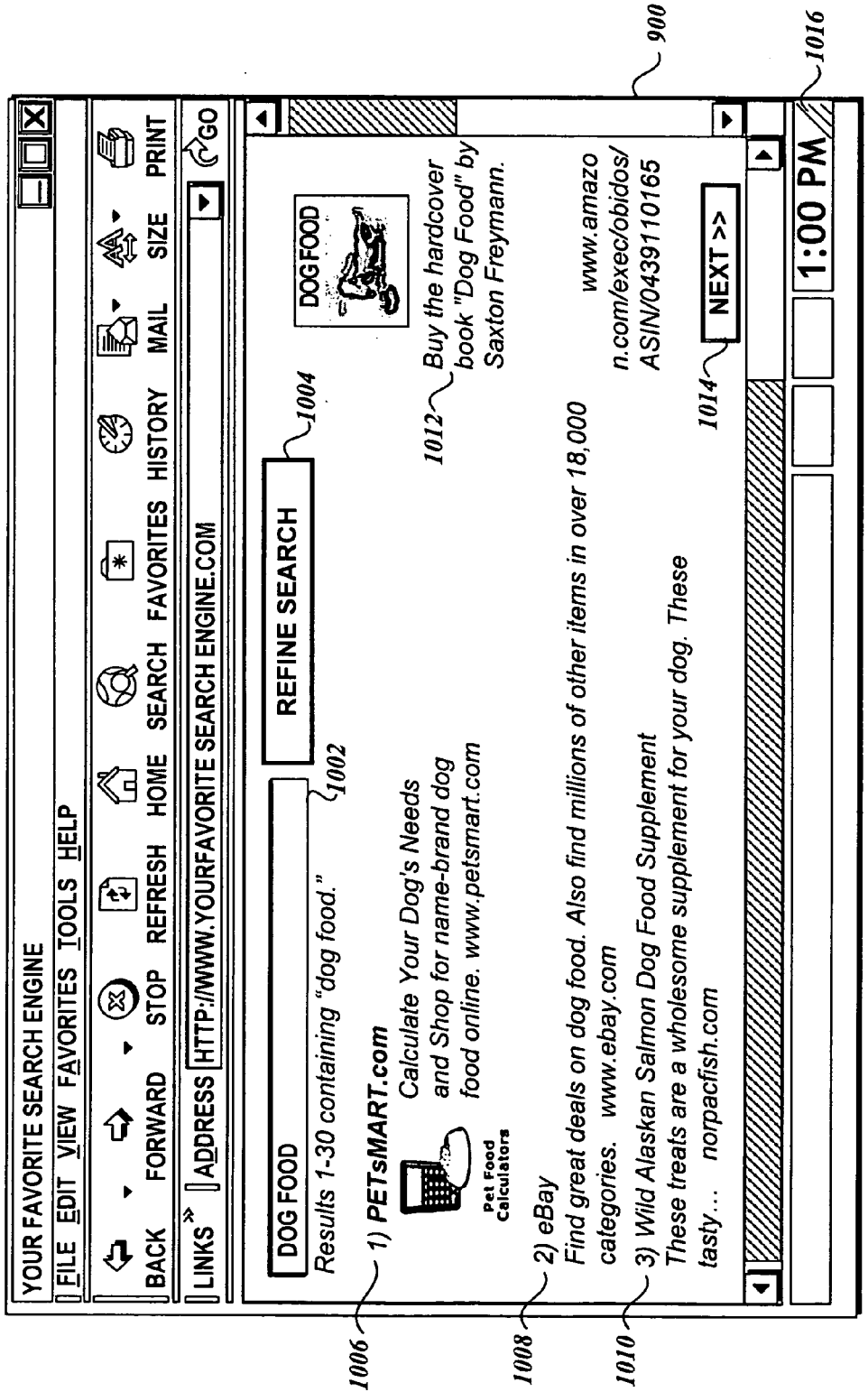
FIG. 10 is a pictorial diagram of an exemplary search engine user interface displaying the search result listings for the search term entered in FIG. 9 in accordance with an embodiment of the present invention.

FIG. 10 illustrates the browser program 900 displaying a Web page generated at 1:00 p.m., as displayed at time box 1016, and in which listings comprising the search results for a search term "DOG FOOD" are displayed. The search results are generated from a search of Web content 120 via the Internet 118, as well as from a commercial listing database 116 operated by the search engine operator. As is known in the art, the search engine 112 may execute program instructions that analyze the listings and rank the "best" listings for display to the user according to a predetermined criterion, such as which pages are most relevant. The best listings are generally displayed in more prominent locations, such as the in-line location previously described, or at the top of a set of listings. The search results may be displayed in a variety of different formats and in different locations on the Web page. In one embodiment of the present invention, the search result optimization system 100 optimizes the placement and display of the listings according to the listing performance and in furtherance of the search engine operator's goals for revenue and relevance, as described with reference to FIGS. 7 and 8.

By way of example only, directly beneath the redisplayed search entry box 1002 and to the left of the Web page, three listings are displayed in accordance with their performance as measured at 1:00 p.m., as shown in time box 1016—(1) PETsMART® listing at reference numeral 1006; (2) eBAY® listing at reference numeral 1008; and (3) Wild Alaska Salmon Dog Food Supplement listing at reference numeral 1010. These three listings occupy the more prominent location on the Web page. The PETsMART and eBAY listings are likely to be paid listings that are listed not only because they are relevant, but also because they are bidded listings associated with bids on the search term "DOG FOOD." Off to the right side of the Web page, across from the first three listings, is one additional listing for the book "Dog Food" by author Saxton Freymann, from Internet bookseller Amazon.com at reference numeral 1012. The Amazon.com listing may also be a paid listing, but occupies the less prominent location on the Web page, referred to as the sidebar, because for this optimization of search results for search term "DOG FOOD," it may be presumed to be less relevant," having to do with a book that just happens to be titled "DOG FOOD" as opposed to dog food itself. Again, by way of example only, the PETsMART listing at reference numeral 1006 is animated with a graphic for a pet food calculator, as is the Amazon.com listing at reference numeral 1012, which is animated with the book cover of the "Dog Food" book. The graphical animation is just one example of the listing context that may influence (in this case enhance) the performance of the listing.

Figure 11:
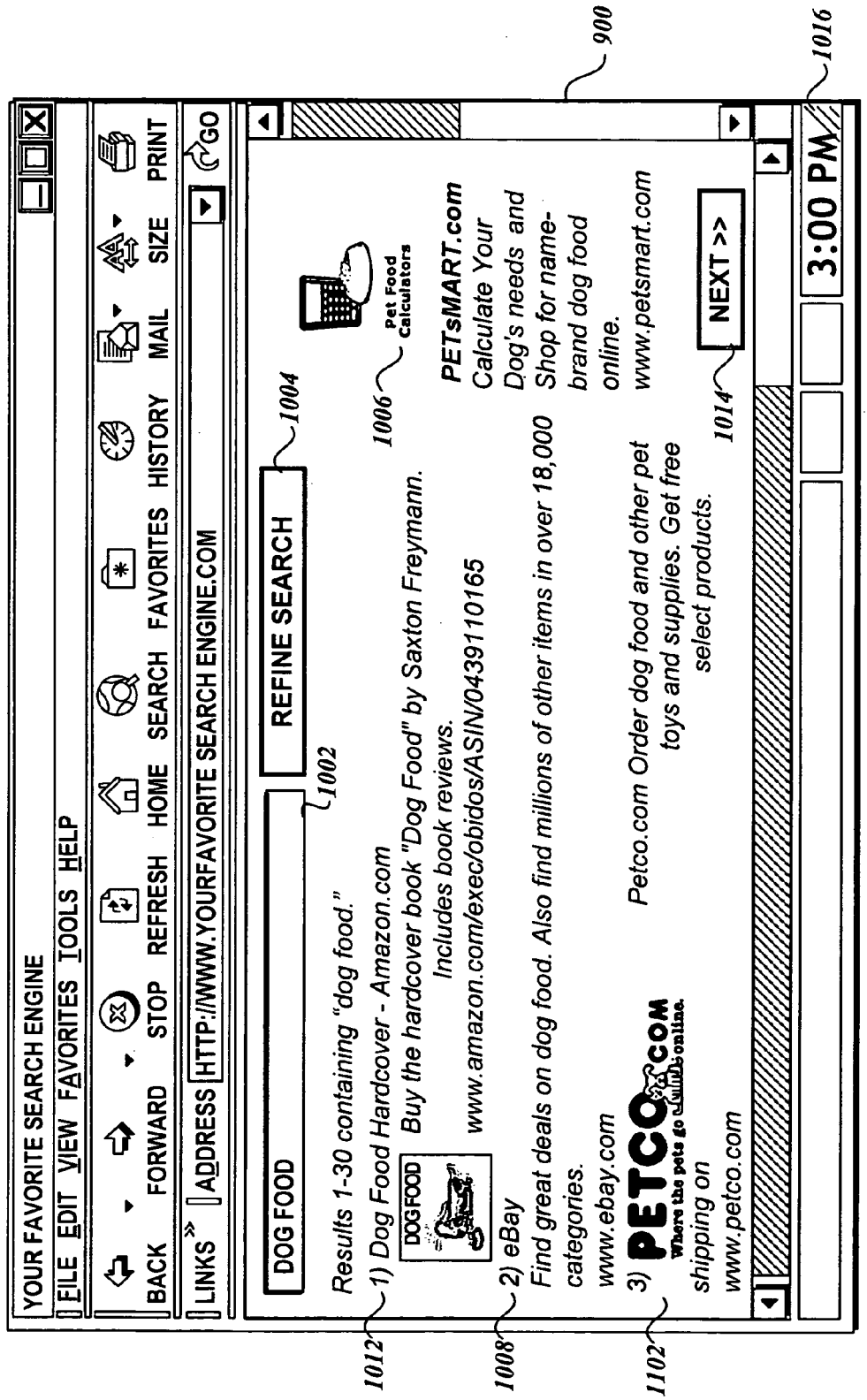
FIG. 11 is a pictorial diagram of the exemplary search engine user interface of FIG. 10 at a later time, after the search result listings for the search term entered in FIG. 9 have been optimized in accordance with an embodiment of the present invention.

FIG. 11 illustrates the browser program 900 displaying another Web page, this time generated later at 3:00 p.m., as displayed at time box 1016, and again in which listings comprising the search results for a search term "DOG FOOD" are displayed. In the illustrated example, it appears that the performance for the paid listing for PETsMART at reference numeral 1006 did not justify retaining the listing in the more prominent location that it occupied earlier, as shown in FIG. 10. For example, if the performance expectation for the listing was 4% CTR, adjusted to 5% CTR because of its position at the top of the set, or because of the pet food calculator graphic enhancement, and the actual performance in the last two hours was only 2%, then the listing would be a candidate for demotion to the position shown in FIG. 11, in the sidebar location to the right of the Web page.

Furthermore, in the illustrated example, it is apparent that the performance for the Amazon.com listing at reference numeral 1012 for the book "Dog Food" is exceeding the expected performance sufficiently, since the last optimization at 1:00 p.m. justifies promoting the listing to the more prominent in-line location directly beneath the search term entry box 1002 as shown in FIG. 11. Circumstances that may have caused such a dramatic change in the performance of the listing might be, for example, that the book "Dog Food" was featured on a television show or in a book review, or that the Christmas buying season has kicked in and the book is a hot Christmas gift item. This boost in performance is probably temporary, but optimizing the search results listings to respond quickly to the changed circumstances for the search term "DOG FOOD" could have a tremendous impact on revenue earned from the Amazon.com listing, not to mention the relevance for the user, and the anticipated increase in return traffic to the search engine operator's Web page that satisfied users will generate.

Other example optimizations illustrated in FIG. 11 include the promotion of the listing for PETCO at reference numeral 1102 to be included in the first page in-line results. Notice that the listing for PETCO is below the eBAY listing at reference numeral 1008, which remains unchanged. This may be because the amount bid by eBAY for inclusion in the search results set for the search term "DOG FOOD" is higher than that bid by PETCO, and the performance of the listing was sufficient to retain the listing in the same in-line location as it earlier appeared. Using the performance optimization process 100, however, the order of the listings for eBAY and PETCO may be switched should the performance of the PETCO listing continue to exceed expectations, and the performance of the eBAY listing fall short of expectations.

While the presently preferred embodiments of the invention have been illustrated and described, it will be appreciated that various changes may be made therein without departing from the spirit and scope of the invention. For example, in one embodiment of the present invention, the search optimization system 100 processes may be implemented in real time to allow for up-to-the-minute optimizations based on the latest performance data captured by the search engine server 112. In another embodiment, the search optimization system 100 processes may be implemented in batch mode to allow for a combination of automated and manual optimizations to the configuration of search result listings. In yet other embodiments, the search result optimization system may be limited in application to paid listings or unpaid listings, ranked or unranked listings, or any combination thereof.

The embodiments of the invention in which an exclusive property or privilege is claimed are defined as follows:

1. A computer-implemented method performed on a first computer for displaying on a screen coupled to a second computer, an optimized placement of search result listings displayed in a search Web page, the method comprising:

said first computer measuring an actual performance of each listing in a set of listings located in one or more Web pages containing a search term and a search result corresponding to the search term, wherein the actual performance comprises at least one of click-through rate (CTR) and context of the listing, and wherein the set of listings includes a plurality of listings;

assigning an expected performance for each listing in the set of listings based on their respective locations, wherein the expected performance comprises a user defined expected CTR and the context of the listing;

determining an average expected performance for the set of listings; tiering the average expected performance of the set of listings based at least on the number of listings in the set of listings to produce a tiered expected performance for the set of listings, wherein the average expected performance is increased when the set of listings includes more than a predefined number of listings and the average expected performance is decreased when the set of listing includes less than a predefined number of listings;

determining an overall average performance for the set of listings based on the actual performance for each listing in the set of listings;

promoting the set of listings to a more prominent location when the overall average performance of the set of listings indicates that overall the actual performance of the listings in the set of listings is better than the tiered expected performance of the set of listings;

demoting the set of listings to a less prominent location when the overall average performance indicates that overall the actual performance of the set of listings is poorer than the tiered expected performance of the set of listings; and displaying a listing from the set of listings at the more prominent location or at the less prominent location.

2. The method of claim 1, wherein assigning the expected performance includes increasing the expected performance when the listing in the set of listings is in a more prominent location, and decreasing the expected performance when the listing is in a less prominent location.

3. The method of claim 2, wherein the listing in the set of listings is in a more prominent location when it is included in the search result.

4. The method of claim 2, wherein the listing in the set of listings is in a more prominent location when it is located near the search term.

5. The method of claim 2, wherein the listing in the set of listings is in a less prominent location when it is located in a sidebar on the Web page.

6. The method of claim 2, wherein the listing in the set of listings is in a less prominent location when it is located separately from the search result.

7. The method of claim 1, further comprising increasing the expected performance of the listing in the set of listings based on a context of the listing, wherein the context of the listing comprises factors that increase performance, including at least one of a position of the listing above other listings, a larger size of the listing relative to other listings, a distinctive formatting applied to the display of the listing, including a contrasting color, a highlighting, an animation, and a graphic, and a good performance of a neighboring listing.

8. The method of claim 1, further comprising decreasing the expected performance of the listing in the set of listings based on a context of the listing, wherein the context of the listing comprises factors that decrease performance, including at least one of a position of the listing below other listings, a smaller size of the listing relative to other listings, a lack of distinctive formatting applied to the display of the listing, and a poor performance of a neighboring listing.

9. The method of claim 1, wherein the performance of a listing is a click-through rate, where the click-through rate is derived from a number of times the listing is displayed in the Web page as compared to a number of times the listing is clicked after being displayed.

10. The method of claim 1, wherein the listing in the set of listings is an unpaid listing, and the expected performance is a threshold level that is tuned to optimize unpaid listing relevance.

11. The method of claim 1, wherein the listing in the set of listings is a paid listing that generates advertising revenue each time it is clicked, and the expected performance is a threshold level that is tuned to optimize paid listing revenue.

12. The method of claim 1, wherein the expected performance of a listing is a threshold performance level that is tuned to a particular market.

13. The method of claim 1, wherein the overall average performance of the set of listings is based on the expected performance of each listing in the set, wherein the expected performance varies based on a location in a Web page of each listing in the set.

14. The method of claim 1, wherein the actual performance is better than the tiered expected performance when the actual performance exceeds the tiered expected performance, and poorer when the actual performance falls short of the tiered expected performance.

15. One or more computer-readable media having computer-executable instructions embodied thereon that, when executed perform a search results optimization system comprising:
   a performance measurement process that measures an actual performance of a listing appearing in a search results Web page against an expected performance level, the expected performance level including settings that are tunable to accommodate different performance expectations in one or more search engine markets, wherein the actual performance comprises at least one of click-through rate (CTR) and context of the listing, wherein the context of the listing does not include performance data of another listing, wherein the expected performance level comprises a user defined expected CTR that is adjusted based on whether the listing appears in a more prominent or less prominent location;
   a listing placement process that determines that a listing should be promoted to a more prominent location selected from a group of at least one more prominent location when the actual performance measures higher than the expected performance level, and that determines that the listing should be demoted demotes the listing to a less prominent location selected from a group of at least one less prominent location when the actual performance measures lower than the expected performance level; and
   a displaying process that displays the listing at the more prominent location or at the less prominent location.

16. The computer-readable media of claim 15, wherein to measure an actual performance includes capturing a number of impressions of a listing and a number of clicks on a listing, and a current location of the listing relative to a location of the search results on the Web page.

17. The computer-readable media of claim 15, wherein the more prominent location is a location in which a listing is expected to receive a greater number of clicks than that received in the less prominent location.

18. The computer-readable media of claim 17, wherein the listing is in the more prominent location when it is located near the search term.

19. The computer-readable media of claim 17, wherein the listing is in the less prominent location when it is located in a sidebar on the Web page.

20. The computer-readable media of claim 17, wherein the listing is in the less prominent location when it is located separately from the search result.

21. The computer-readable media of claim 15, wherein the expected performance levels in a performance settings repository are tuned to optimize at least one of advertising revenue and search result relevance.

22. The computer-readable media of claim 15, wherein the performance measurement process takes a context of the listing into consideration when measuring the actual performance of the listing against the expected performance level for the listing.

23. The computer-readable media of claim 15, wherein the context of the listing comprises factors that increase performance, including at least one of a position of the listing above other listings, a larger size of the listing relative to other listings, a distinctive formatting applied to the display of the listing, including a contrasting color, a highlighting, an animation, and a graphic, and a good performance of a neighboring listing, and factors that decrease performance, including at least one of a position of the listing below other listings, a smaller size of the listing relative to other listings, a lack of distinctive formatting applied to the display of the listing, and a poor performance of a neighboring listing.

24. The computer-readable media of claim 15, wherein the actual performance measures higher than the expected performance level when the actual performance is greater than the expected performance, and measures lower when the actual performance is less than the expected performance.

25. One or more computer-readable media having computer-executable instructions embodied thereon that, when executed perform a method for facilitating the optimal placement of search result listings in a search result user interface, the method comprising:
   placing a listing for a search result in an initial location based on an expected click-through rate (CTR);
   capturing an actual CTR of the listing, wherein capturing the actual CTR of the listing includes capturing a location of the listing and a context of the listing when it was clicked;
   normalizing the actual CTR based on the location, wherein normalizing the actual CTR adjusts the actual CTR down when the location has a positive influence on the actual CTR, and adjusts the actual CTR up when the location has a negative influence on the actual CTR;
   normalizing the actual CTR based on the context, wherein normalizing the actual CTR adjusts the actual CTR down when the context has a positive influence on the actual CTR, and adjusts the actual CTR up when the context has a negative influence on the actual CTR; and
   promoting the listing to a more desirable location when the normalized CTR is better than the expected CTR, and demoting the listing to a less desirable location when the normalized CTR is worse than the expected CTR, wherein promoting and demoting the listing is independent of the promotion or demotion of any other listings.

26. The computer-readable media of claim 25, wherein the context of the listing comprises factors that influence performance, including at least one of a position of the listing relative to other listings appearing in the search results user interface, a size of the listing relative to other listings, a presence or absence of distinctive formatting applied to the display of the listing relative to the other listings, including a contrasting color, a highlighting, an animation, and a graphic, and a CTR of an adjacent listing.

27. The computer-readable media of claim 25, wherein the listing is a pay-per-click listing and the expected CTR is set to optimize revenue earned from the listing.

28. The computer-readable media of claim 25, wherein the listing is an unpaid listing and the expected CTR is set to optimize relevance of the placement of the search result listing.

29. One or more computer-accessible media having computer-executable instructions embodied thereon that, when executed, cause a computing device to perform a method for displaying on a display device a search result Web page for a search term query, the search result Web page including at least two sections in which to display a search result listing, the at least two sections including a first section located in a more prominent area of the display device and the a second section located in a less prominent area of the display device, the method comprising:
    assigning an expected performance of a search result listing based on a user defined expected click-through rate (CTR) that is adjusted based on a location of the section in the Web page in which it appears, wherein the expected performance of a listing is a threshold performance level that is tuned to a particular market:
    said computing device measuring an actual performance of the search result listing, wherein the actual performance comprises at least one of CTR and context of the listing;
    said computing device comparing the actual performance to the expected performance;
    determining that the listing should be moved to the more prominent first section when the actual performance is better than the expected performance;
    determining that the listing should be moved to the less prominent second section when the actual performance is poorer than the expected performance;
    displaying the listing in the more prominent first section or in the less prominent second section, and
    wherein assigning the expected performance includes increasing the expected performance when the listing is in the more prominent first section and decreasing the expected performance when the listing is in the less prominent second section, and
    wherein determining that the listing should be moved to the more prominent or less prominent section is independent of an actual performance of any other listings.

30. The computer-accessible media of claim 29, wherein the more prominent first section includes the most relevant search result listings.

31. The computer-accessible media of claim 29, wherein the more prominent first section is located near a search term entry associated with the search result listings.

32. The computer-accessible media of claim 29, wherein the less prominent second section is located in a sidebar on the Web page.

33. The computer-accessible media of claim 29, wherein the less prominent second section includes less relevant search result listings than the more prominent first section.

34. The computer-accessible media of claim 29, further comprising increasing the expected performance of the listing based on a context of the listing, wherein the context of the listing comprises factors that increase performance, including at least one of a position of the listing above other listings, a larger size of the listing relative to other listings, a distinctive formatting applied to the display of the listing, including a contrasting color, a highlighting, an animation, and a graphic, and a good performance of a neighboring listing.

35. The computer-accessible media of claim 29, further comprising decreasing the expected performance of the listing based on a context of the listing, wherein the context of the listing comprises factors that decrease performance, including at least one of a position of the listing below other listings, a smaller size of the listing relative to other listings, a lack of distinctive formatting applied to the display of the listing, and a poor performance of a neighboring listing.

36. The computer-accessible media of claim 29, wherein the performance of a listing is a click-through rate, where the click-through rate is derived from a number of times the listing is displayed in the Web page as compared to a number of times the listing is clicked after being displayed.

37. The computer-accessible media of claim 29, wherein the listing is an unpaid listing, and the expected performance is a threshold level that is tuned to optimize unpaid listing relevance.

38. The computer-accessible media of claim 29, wherein the listing is paid listing that generates advertising revenue each time it is clicked, and the expected performance is a threshold level that is tuned to optimize paid listing revenue.

39. The computer-accessible media of claim 29, wherein the performance of a listing is based on an overall performance of the section in which the listing appears, and moving the listing includes moving all of the listings appearing in the section based on the overall performance.

40. The computer-accessible media of claim 39, wherein the overall performance of the first and second sections is based on the expected performance of each listing in the first and second sections, wherein the expected performance is based on where each listing appears within the first and second sections.

41. The computer-accessible media of claim 29, wherein the actual performance is better than the expected performance when the actual performance exceeds the expected performance, and poorer when the actual performance falls short of the expected performance.

\* \* \* \* \*